UNITED STATES PATENT OFFICE.

JAMES PRINGLE COCHRANE, OF EDINBURGH, SCOTLAND.

MANUFACTURE OF GOLF-BALLS.

SPECIFICATION forming part of Letters Patent No. 703,896, dated July 1, 1902.

Application filed March 22, 1902. Serial No. 99,533. (No model.)

*To all whom it may concern:*

Be it known that I, JAMES PRINGLE COCHRANE, golf-ball manufacturer, of 27 Albert street, Edinburgh, Scotland, have invented certain new and useful Improvements in the Manufacture of Golf-Balls, of which the following is a specification.

This invention has for its object to manufacture golf-balls of gutta-percha in such a manner that while still retaining the rebounding and elastic nature of the ball the surface is so hard that the ball will not be so readily cut, defaced, or deformed by play as balls made under the present system, and thus they will last much longer. Besides, golf-balls manufactured in accordance with my invention can be used within a very short time of being made, whereas those presently constructed have to lie for a considerable period to harden the gutta-percha.

In carrying out my invention I take the piece of gutta-percha rod of which the ball is to be made and after softening it in hot water I manipulate it so as to make it as round as possible in the hand. I then sprinkle the surface over with sulfur. I afterward roll it about and over a hot plate, when the outer skin or surface of the gutta-percha becomes impregnated with the sulfur and becomes vulcanized, thus rendering it very hard, without in any way neutralizing the rebounding and elastic nature of the gutta-percha. It is afterward placed in a mold and treated in the usual way. When the ball is finished, it is of such a nature as not to be very readily cut or defaced with ordinary play.

I claim—

1. In the manufacture of golf-balls, softening the gutta-percha rod with hot water, manipulating it to make it round, and sprinkling the surface with sulfur, substantially as hereinbefore described.

2. In the manufacture of golf-balls softening the gutta-percha rod with hot water, manipulating it to make it round, and sprinkling the surface with sulfur, rolling the piece over a hot plate so that the outer skin or surface of the gutta-percha gets impregnated with the sulfur and becomes vulcanized and thereby rendering it very hard without in any way neutralizing the rebounding and elastic nature of the gutta-percha, substantially as hereinbefore described.

In testimony whereof I have hereunto affixed my signature in presence of two witnesses.

JAMES PRINGLE COCHRANE.

Witnesses:
JOHN LIDDLE,
AGNES MACKINTOSH.